United States Patent [19]

Hama

[11] Patent Number: 5,044,814
[45] Date of Patent: Sep. 3, 1991

[54] CLAMPING BAND
[75] Inventor: Taira Hama, Chino, Japan
[73] Assignee: Kabushiki Kaisha Mihama Seisakusho, Chino, Japan
[21] Appl. No.: 459,025
[22] Filed: Dec. 29, 1989
[30] Foreign Application Priority Data
  Jan. 18, 1989 [JP] Japan .................................... 1-9056
[51] Int. Cl.⁵ .......................... F16B 2/18; B65D 63/02
[52] U.S. Cl. .................................... 403/290; 24/20 R; 24/273
[58] Field of Search ................ 24/20 R, 20 S, 20 EE, 24/20 CW, 273; 403/290, 289, 344

[56] References Cited
U.S. PATENT DOCUMENTS 2,768,418 10/1956 Hoy et al. .................. 24/20 CW
4,272,871 6/1981 Weinhold .................... 24/273 X
4,713,863 12/1987 Jennings .................... 24/20 EE X
4,742,600 5/1988 Calmettes et al. ............ 24/20 EE X
4,858,279 8/1989 Kato et al. .................. 24/20 S X Primary Examiner—Peter M. Cuomo
Attorney, Agent, or Firm—Jordan and Hamburg

[57] ABSTRACT

The present invention relates to a clamping band having ends, more precisely relates to one which can be attached or detached after a member to be clamped is connected to a hose, etc. and which has high clamping force. In the clamping band of the present invention, the projection of the lever can be easily fitted in the engagement hole of the band, so that the fulcrum point of the lever can be easily fitted, and clamping work including winding action and lever operation can be executed smoothly.

7 Claims, 7 Drawing Sheets

CLAMPING BAND

BACKGROUND OF THE INVENTION

The present invention relates to a clamping band to clamp joint sections of hose such as gas hose, car boot, etc.

Figure 19:
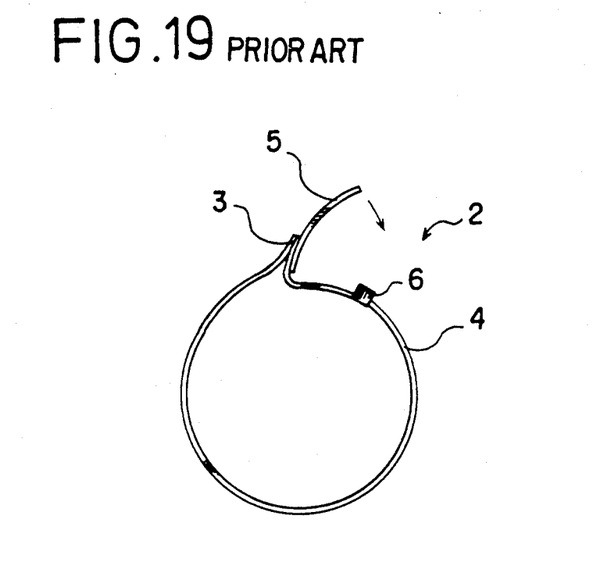
FIGS. 19 and 20 are side views of conventional clamping bands.

A metal clamping band, which clamps hose, car boot, etc. in one action, has been known, e.g. Japanese Patent Publication Gazette No. 50-14702. The conventional clamping band is shown in FIG. 19. It comprises a band 4, which is formed like a ring and whose both ends are connected to form an overlap section 3, a lever 5 fixed to the overlap section 3, and a clasp 6 for fixing the end section of the lever to the band 4 when the band 4 is shortened in diameter by the lever 5 with the action of levers.

A clamped member such as hose has been inserted in the band 2 and has been connected to a pipe, etc. beforehand. Then, the band 2 is moved to the joint section and the lever 5 is rotated in the direction shown by the arrow. In this rotation, the front end 5a of the lever 5 works as the power point while another end 5b contacting the band 4 of the lever 5 acts as the fulcrum point, so that the overlap section 3 shortens the diameter of the band 4 as the active point.

The front end of the lever 5 of the clamping band 4 shortened to clamp is fixed by the clasp 6 to maintain the clamping status.

The clamping band 2 can be used quickly and easily but it is impossible to clamp a member after the member is connected to a pipe, etc. Therefore, in case the clamping band is to exchanged because of repairs, etc., the clamped member must be detached.

The conventional clamping band is inconvenient for repairs for that reason. If the clamped member cannot be detached, the clamping band cannot be exchanged.

Figure 20:
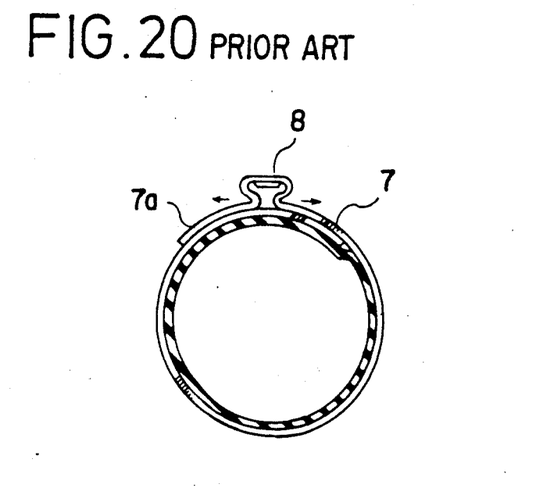

A dividable clamping band shown in FIG. 20 is also known. Both ends of a band 7 are overlapped and connected to form like a ring. There is projected an ear 8 formed like a gate from the outer face 7a of the band. The clamping band is shortened in diameter by crushing the ear 8. It can be attached to round the clamped member after the clamped member is connected. However, the clamping band is made of metal, so that crushed ear 8 springs back in the end and it is impossible to clamp tightly.

SUMMARY OF THE INVENTION

The object of the present invention is to provide a clamping band which can be easily attached and clamped after the member to be clamped such as hose, etc. is connected, and which has high clamping force.

The present invention is characterized in that the clamping band comprises a band having an engagement hole bored in one end section thereof, and a lever one end or the mid section of which is fixed to the other end of the band, a projected section being formed at the other end of the band and the projected section being insertable in the engagement hole of the band from outside, whereby the lever can shorten the diameter of the band by rotating around the projected section as the fulcrum point.

In this clamping band, a plurality of engagement holes may be bored in the longitudinal direction of the band at prescribed intervals. The engagement hole can be formed by projecting a portion of the band outwardly at the one end section thereof and by opening a part of the portion projected. The one end section of the band may be bent outwardly along a line crossing the engagement hole. There may be formed an extended section extending forwardly from the line. A pressing piece may be provided in the vicinity of the other end of the band fixed by the lever to fill up the gap between the fulcrum point of the lever and the other end section of the band which is formed when the diameter of the band is shortened by rotating the lever.

BRIEF DESCRIPTION OF THE DRAWINGS

The present invention will be apparent from the following description, reference being had to accompanying drawings wherein preferred embodiments of the present invention are clearly shown.

In the drawings.

DETAILED DESCRIPTION OF PREFERRED EMBODIMENTS

Preferred embodiments of the present invention will now be described in detail with reference to accompanying drawings.

Figure 1:
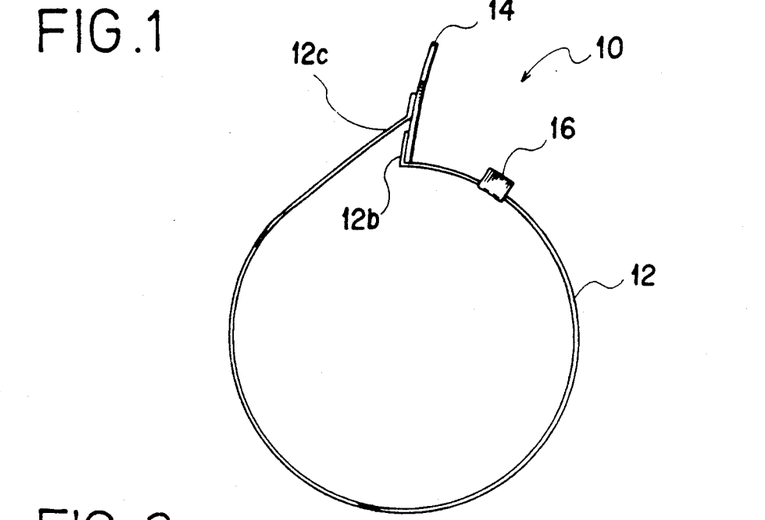
FIG. 1 is a side view of the clamping band of the present invention.
Figure 2:
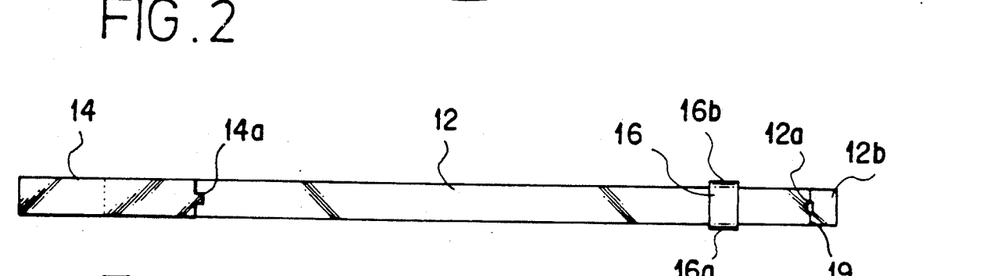
FIG. 2 is a bottom view of the clamping band developed.
Figure 3:
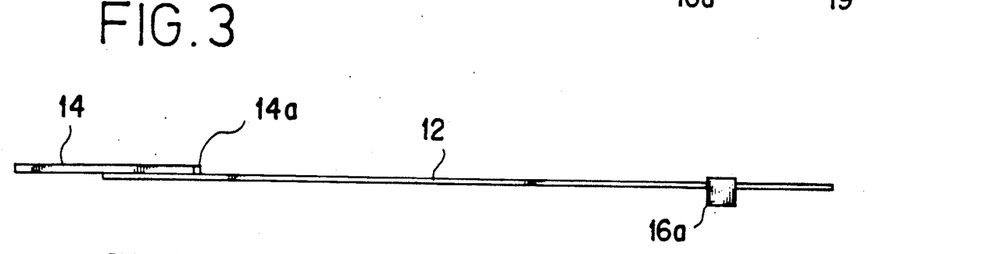
FIG. 3 is a side view of the clamping band of FIG. 2.
Figure 4:
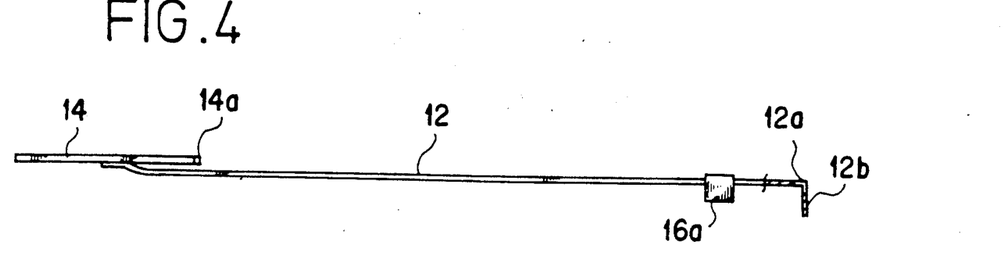
FIG. 4 is a partially sectional side view of the clamping band bent along a line crossing the engagement hole.

FIG. 1 is a side view of the clamping band of the present invention and FIG. 2 is a bottom view of the band developed.

The clamping band 10 comprises a band 12 made of rectangular metal plate, a lever 14 for shortening the diameter of the band 12, and a clasp 16 for fixing the lever 14.

There is bored an engagement hole 12a at one end section of the band 12. The other end of the band 12 is fixed at the mid section by spot welding. There is formed a projected section, which can fit in the engagement hole 12a of the band 12 and which can be the fulcrum point when the lever 14 shortens the diameter of the band 12, at one end of the lever 14. The length of the projected section 14a is preferably longer than the thickness of the band 12.

In FIG. 2, one end section of the band 12 is bent along the line 19 (shown by a solid line) crossing the engagement hole 12a. The end side of the line 19 is formed as a standing section 12b. Note that a U-shaped clasp 16 is fixed near the engagement hole 12a of the one end section of the band 12, bridging over the band 12 and both side sections of which are opened outwardly. Namely, standing pieces 16a and 16a are outwardly standing and clipping the band 12.

Next, clamping process with above stated clamping band 10 will be described.

A member to be clamped such as hose, etc. is connected to a pipe, etc. The clamping band 10 is wound on the outer face of the joint section of the clamped member. The projected section 14a of the lever 14 of the clamping band 10 is fitted in the engagement hole 12a of the band 12. Note that the standing section 12a is bent along the line 19 crossing the engagement hole 12a, it will be easy to engage the projected section 14a of the lever 14 with the engagement hole 12a of the band 12, and the band 12 is held in position if the lever 14 is contacted the standing piece 12b.

Figure 5:
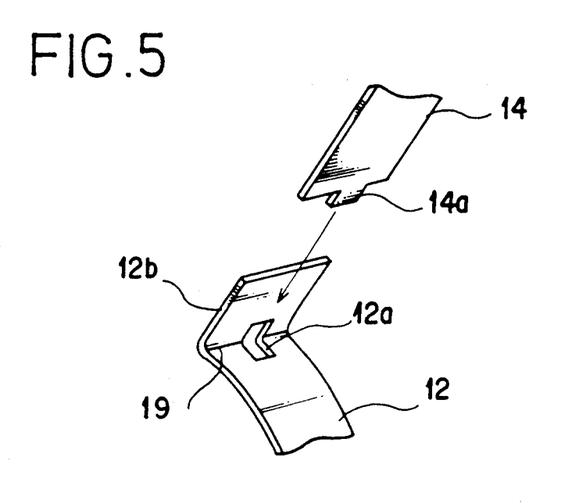
FIG. 5 is a partial perspective view of the principal part of the clamping band.

Successively, the lever 14 is rotated around the projected section 14a, which is fitted in the engagement hole 12, as the fulcrum point to shorten the diameter of the band 12. The lever 14 is rotated until it contacts the band 12. Rotating the lever 14, the welded section 12c of the band 12, which is welded to the lever 14, pushes down the standing piece 12b, so that there are no projecting parts on the outer face of the clamping band. The front end of the lever 14 is located between the standing pieces 16a and 16b the clasp 16. The standing pieces 16a and 16a are hit down inwardly by hammer, etc. to fix the lever 14. Note that, as shown in FIG. 5, the one end section of the band 12 is bent along the line crossing the engagement hole 12a, the engagement hole 12a is bored from the standing piece 12b to the portion which contacts the clamped member. Therefore, the projected section 14a of the lever 14 is fitted in the engagement hole 12a, even if the lever 14 is lying.

Figure 6:
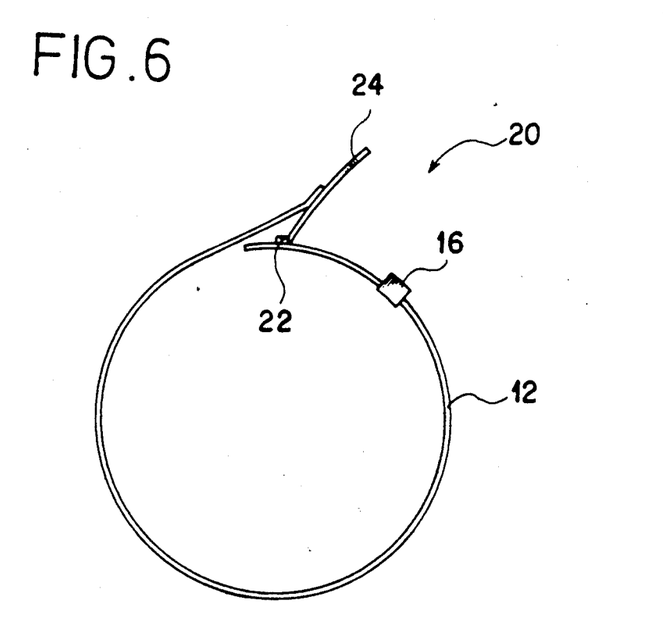
FIG. 6 is a side view of the clamping band of another embodiment.
Figure 7:
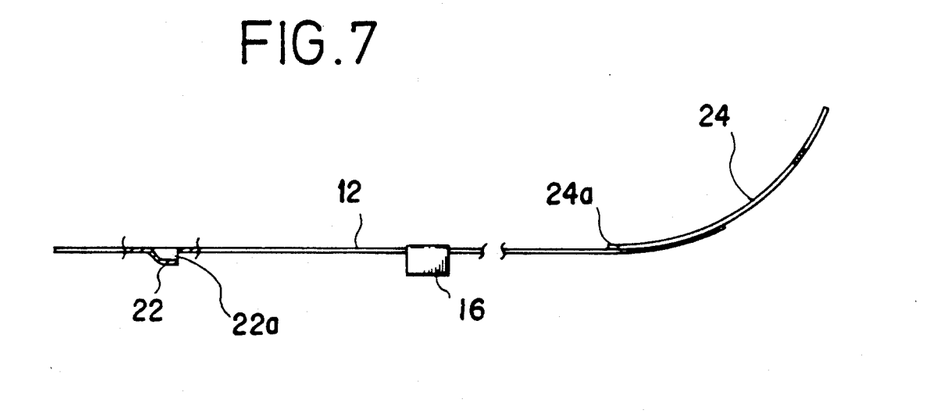
FIG. 7 is a partially sectional view of the clamping band developed of FIG. 6.
Figure 8:
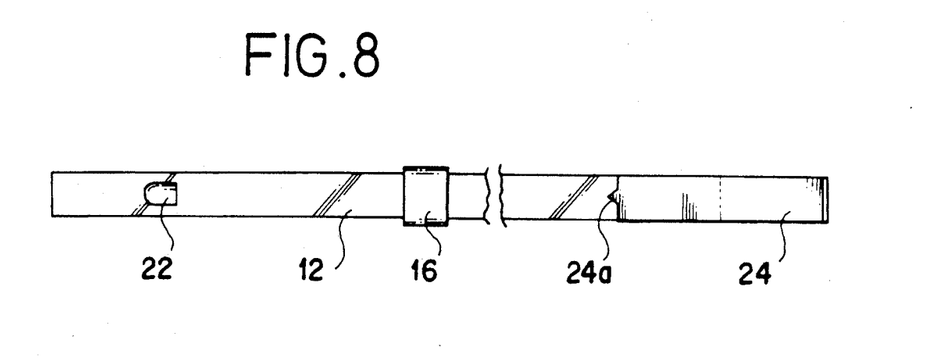
FIG. 8 is a partial plan view of the clamping band developed of FIG. 6.

FIG. 6 shows a modified example of the clamping band 10. This clamping band 20 has an engagement projection 22 instead of the engagement hole 12 of above described clamping band 10. The engagement projection 22 is formed by punching the band 12 with a punch, etc., and an opening 22a is bored in the clasp 16 side of the projection 22. FIG. 7 shows the clamping band developed with the engagement projection 22 in section. And FIG. 8 shows a bottom view of the clamping band. The lever 24 for shortening the diameter of the band 12 is welded at the one end section of the band 12 of the clamping band 20. There is formed a mountain-like projection 24a at the front end of the lever 24 (see FIG. 8). The projection 24a is diagonally inserted in the opening 22a of the engagement projection 22 when the band 12 is formed like a ring (see FIG. 6).

Clamping action of the clamping band 20 will be described.

Figure 9:
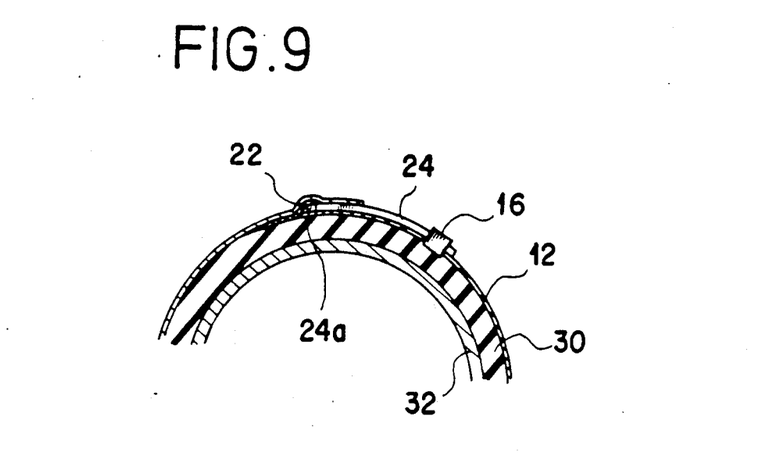
FIG. 9 is an explanatory view of the clamping band of FIG. 6 in clamping status.

A member 30 to be clamped such as hose, etc. is connected to a pipe 32, then the clamping band 20 is wound on the outer face of the joint section of the member 30. The projection 24a of the lever 24 of the clamping band 20 is fitted to the engage projection 22 of the band 12. And the lever 24 is rotated around the projection 24a as the fulcrum point to shorten the diameter of the ring-like band 12. Then the front end of the lever 24 is fixed by the clasp 16 in the same manner as described above (see FIG. 9). Note that the opening 22a of the engagement projection 22 is opened on the clasp 16 side only, the projection 24a engaging with the engagement projection 22 of the lever 24 is held in position. The portion from the engagement projection 22 to the front end of the band 12 contacts the clamped member, so that a step formed by both end sections of the band 12 can be smaller than the clamping bands shown in FIGS. 1-5. The portion from the engagement projection 22 to the front end is an extended section.

Figure 10:
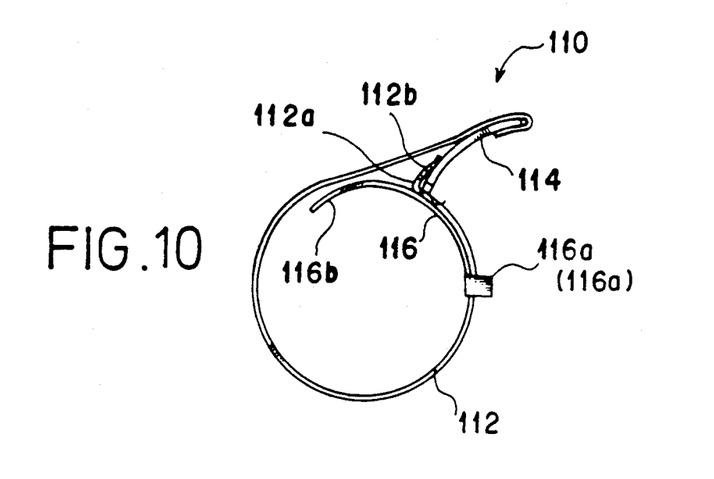
FIG. 10 is a side view of the clamping band of another embodiment.
Figure 11:
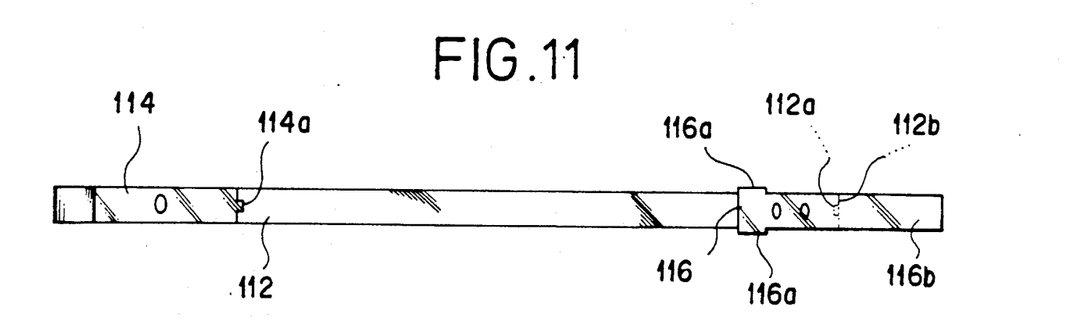
FIG. 11 is a plan view of the clamping band developed of FIG. 10.
Figure 12:
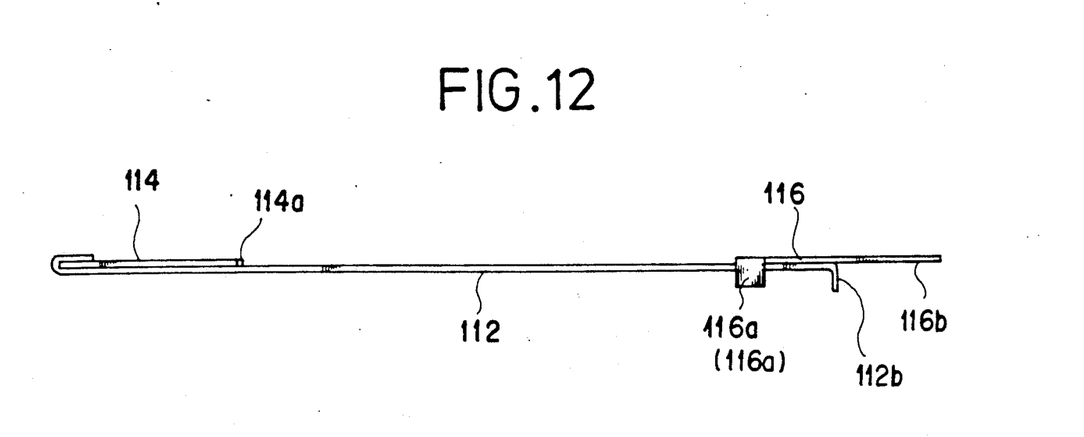
FIG. 12 is a side view of the clamping band developed of FIG. 10.

FIG. 10 is another embodiment and it is a side view before clamping. FIG. 11 is a plan view of the clamping band developed. FIG. 12 is a side view thereof.

Figure 13:
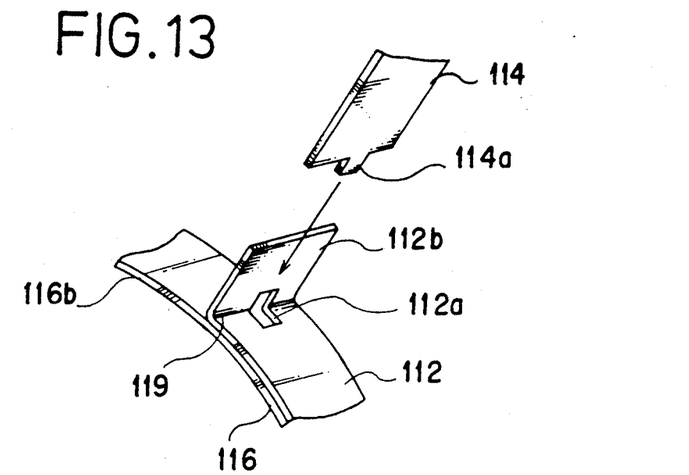
FIG. 13 is a partial perspective view of the principal part of the clamping band of FIG. 10.

The clamping band 110 comprises, the same as former embodiments, a band 112, a lever 114 for shortening the diameter of the band 112, and a clasp 116 for fixing the lever 114. There is bored an engagement hole 112a at one end section of the band 112. A standing section 112b is formed by outwardly bending along the line 119 crossing the engagement hole 112a. The other end of the band 112 is bent to clip the upper end of the lever 114 and is fixed to the lever 114 by spot welding. There is formed a projection 114a, which can be fitted in the engagement hole 112a of the band 112 to be the fulcrum point when the lever 114 shortens the diameter of the band 112, at the one end of the lever 114. The status where the projection 114a of the lever 114 is fitted in the engagement hole 112a of the band 112 is shown in FIG. 13. The clasp 116 is fixed along the inner side of the band 112. The clasp 116 has an extended section 116b, which extends forward from the standing section 112b of the band 112. There are provided standing pieces 116a and 116a at the rear end of the clasp 116. The standing pieces 116a and 116a are located at the position corresponding to the front end of the lever 114 which is rotated on the projection 114a as an axis to lie. The lever 114 lying is fixed by bending the standing pieces 116a and 116a inwardly with a hammer, etc.

The process of clamping hose with this clamping band 110 will be described.

A member to be clamped such as hose, etc. is connected to a pipe, etc., and the clamping band 110 is wound on the outer face of the member. The projection 114a of the lever 114 of the clamping band 110 is fitted in the engagement hole 112a at the one end of the band 112. Note that the standing section 112b is bent along the line 119 crossing the engagement hole 112a, so that it is easy to fit the projection 114a of the lever 114 in the engagement hole 112a, and the band 12 is held in position if the lever 114 contacts the standing piece 112b of the band 112 (see FIG. 13). Successively, fitting the projection 114a of the lever 114 in the engagement hole 112a, the lever 114 is rotated to shorten the diameter of the band 112 on the one end of the lever 114 as an axis for clamping. Then, the lever 114 is forced down until it contacts the band 112, and the lever 114 is fixed by bending the standing pieces 116a and 116a inwardly by a hammer, etc. The extended section 116b of the clasp 116 is provided along the joint section of both ends of the band 112 from inside, so that the projection 114a of the lever 114, which is fitted in the engagement hole 112a at the one end section of the band 112, does not damage the clamped member.

Figure 14:
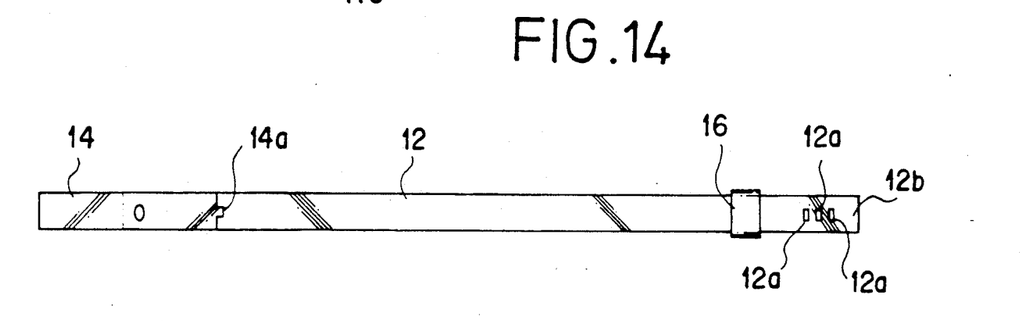
FIG. 14 is a development view of a modified example of the clamping band.

In the clamping band 10 shown in FIGS. 1-5, the one end section of the band is bent along the line crossing the engagement hole, but the projection of the lever can be fitted in the engagement hole of the band without bending, so that the fitting section has the function of the fulcrum point. In the clamping band 10 without bending along the line 19 crossing the engagement hole 12a, a plurality of engagement holes 12a . . . can be bored (see FIG. 14). With this structure, one clamping band can clamp members having various size. Further, clamping force of the clamping band 10 can be adjustable.

Figure 15:
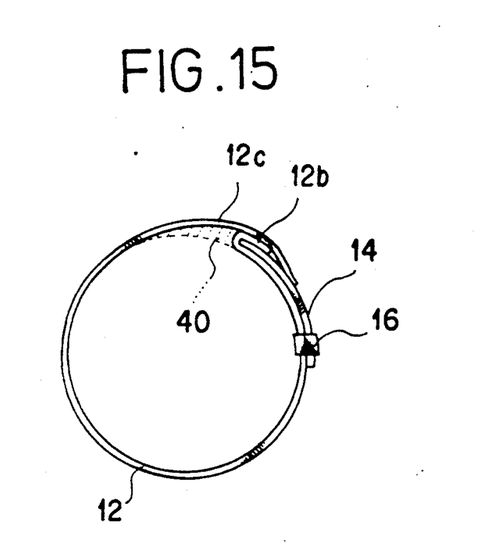
FIGS. 15 and 16 are partial side views of other embodiment.
Figure 16:
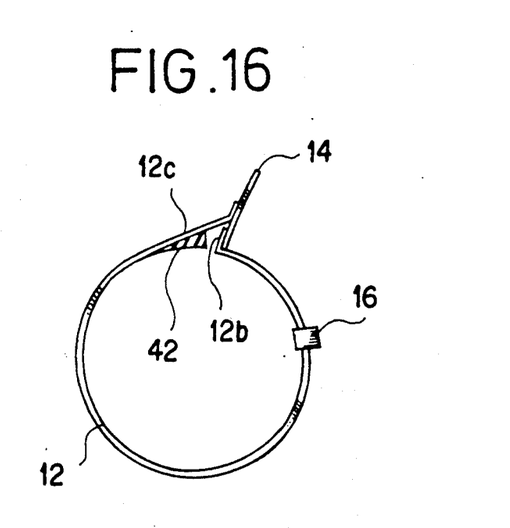
Figure 17:
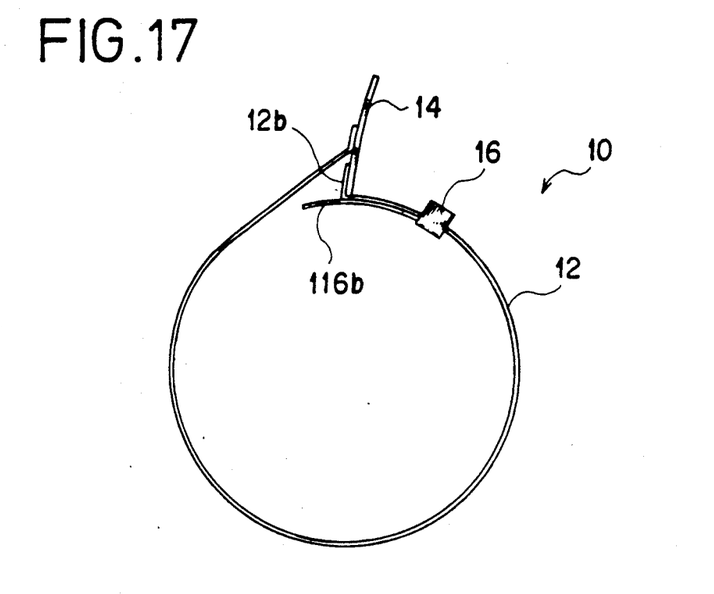
FIG. 17 is a side view of the clamping band which has a pressing piece.

In the clamping band shown in FIGS. 1-5, its clamping status being shown in FIG. 15, the standing section 12b of the band 12 is folded back, so that a welded section 12c, which is near the other end of the band 12 fixed to the lever 14, does not contact the clamped member; the gap 40 is formed, so that uniform clamping force onto the clamped member cannot be effected. To fill up the gap 40, there may be provided a pressing piece 42 shown in FIG. 16, whose inner face is formed as an arc, on the inner face of the band corresponding to the gap 40. The pressing piece 42 may be an arc plate. Like the clamping band 110 shown in FIG. 10, the extended section 116b may be provided at the one end section of the band (see FIG. 17).

If the engagement hole is a bottomed hole, which is formed by drawing, etc., the strength of the engagement hole and the standing section will be raised.

Figure 18A:
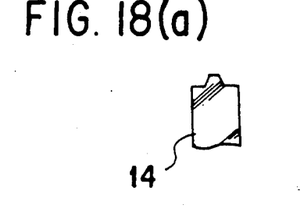
FIGS. 18(a) and 18(b) are explanatory views of modified examples of the projected section of the lever.
Figure 18B:
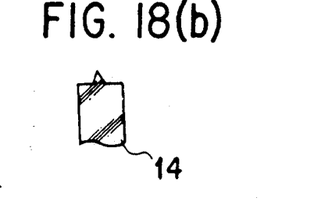

If the projection of the lever is formed taper-shaped as shown in FIG. 18(a) and (b), it is easier to fit the projection in the engagement hole.

Preferred embodiments of the present invention have been described in detail, but the present invention is not limited to above stated embodiments; for example, the shape of the projection of the lever and the shape of the engagement hole of the band can be changed at the user's option, and many modifications can be allowed without deviating from the scope of the invention.

The clamping band of the present invention has the following advantages.

It can wind on the outer face of the joint section of the member to be clamped after the member such as hose, etc. is connected to pipe, etc., and can easily clamp the member by lever action. The projection of the lever is fitted in the engagement hole, etc. of the band, and the lever is rotated around the fitted section as the fulcrum point to shorten the diameter of the band, so the fulcrum point is held in position and it is easier to do clamping work. Further, in case of bending the one end of the band outwardly, the lever is held by the bent section, so it is easier to fit the projection of the lever in the engagement hole of the band.

What is claimed is:

1. A clamping band comprising an elongated member adapted to be clamped around an object, said band having first and second ends and first and second faces, the first and second faces forming a convex outer face, and a concave inner face when the band is clamped around the object, fulcrum means formed on the first face of the elongatged member substantially closer to said first end of the elongated member than to said second end, a lever fixed to the second end of the elongated member and having one end shaped to releasably engage and disengage the fulcrum means at said first face in a direction transverse of said first and second faces, the lever being pivotable about the fulcrum means when said shaped end is engaged with the fulcrum means from a non-clamping orientation extending outwardly away from the elongated member to a clamping orientation overlying the elongated member, whereby the elongated member can be wound around the object to be clamped with the shaped end of the lever disengaged from the fulcrum means, the shaped end of the lever being then engagable with the fulcrum means to enable the lever be pivoted from the non-clamping orientation to the clamping orientation.

2. A clamping band according to claim 1, in which the fulcrum means is a hole extending transversely in the elongated member spaced from said first end, said hole extending through said elongated member between said faces, and the shaped end comprises a projection formed on the lever, the projection being receivable in the hole.

3. A clamping band according to claim 2, further comprising at least one additional fulcrum means, each of the additional fulcrum means being a hole extending between said faces for separately receiving said projection, the holes being located at lengthwise intervals in the elongated member.

4. A clamping band according to claim 2, in which the end of the elongated member in which the hole is formed is bent outwardly along a crease line perpendicular to the lengthwise dimension of the elongated member and the outwardly bent portion of the elongated member includes at least a portion of the hole.

5. A clamping band according to claim 4, in which the crease line bridges the hole.

6. A clamping band according to claim 5, further comprising a filler piece fixed to a portion of the inner face of the elongated member, the filler piece having an exposed concave surface matching the curvature of the second face of the elongated member when the band is clamped, the filler piece being so located as to compensate for and eliminate an out-of-round configuration of the interior of the elongated member when the lever is in its clamping orientation, the out-of-round configuration being due to mutual overlapping of end portions of the elongated member with each other and with the lever when the lever is in its clamping orientation.

7. A clamping band according to claim further comprising a U-shaped clasp slidably mounted on said elongated member for securing the lever to the elongated member when the lever is in its clamping orientation.

* * * * *